United States Patent [19]

Kasuya

[11] Patent Number: 5,587,812
[45] Date of Patent: Dec. 24, 1996

[54] FACSIMILE APPARATUS WITH COMMON SHEET CONVEYING PATH

[75] Inventor: Michio Kasuya, Yokohama, Japan

[73] Assignee: Canon Kabushiki Kaisha, Tokyo, Japan

[21] Appl. No.: 354,023

[22] Filed: Dec. 6, 1994

[30] Foreign Application Priority Data

Dec. 13, 1993 [JP] Japan ................................. 5-312016
Oct. 20, 1994 [JP] Japan ................................. 6-255245

[51] Int. Cl.$^6$ .................................................. H04N 1/00
[52] U.S. Cl. ................................... 358/498; 355/308
[58] Field of Search ........................... 358/498, 496–497, 358/296; 355/308–309

[56] References Cited

U.S. PATENT DOCUMENTS

| | | | |
|---|---|---|---|
| 4,568,177 | 2/1986 | Sato et al. | 355/309 |
| 4,734,747 | 3/1988 | Okuda et al. | 355/308 |
| 4,768,063 | 8/1988 | Kunishima et al. | 355/29 |
| 4,961,091 | 10/1990 | Kasuya et al. | 355/321 |
| 5,006,904 | 4/1991 | Matsuo et al. | 355/308 |
| 5,379,121 | 1/1995 | Yamada et al. | 358/496 |

Primary Examiner—Stephen Brinich
Attorney, Agent, or Firm—Fitzpatrick, Cella, Harper & Scinto

[57] ABSTRACT

A facsimile apparatus is constructed with a minimum number of parts in a size as compact as possible, capable of reading, recording, and receiving data automatically. The facsimile apparatus which has an original sheet conveying path for conveying an original and a recording sheet conveying path for conveying a recording sheet, comprising: a common sheet conveying path for conveying either the original or the recording sheet, and which is provided downstream of the original sheet conveying path and the recording sheet conveying path; feeder selection means, provided upstream of the common conveying path, for picking-up either the original or the recording sheet by selection; reading means, provided on the common conveying path, for reading the original led to the common conveying path by the feeder selection means; recording means, provided on the common conveying path, for recording on the recording sheet conveyed led to the common conveying path by the feeder selection means; and ejecting means for ejecting the original and the recording sheet.

11 Claims, 5 Drawing Sheets

FACSIMILE APPARATUS WITH COMMON SHEET CONVEYING PATH

BACKGROUND OF THE INVENTION

The present invention relates to a facsimile apparatus and, more particularly, to a facsimile apparatus comprising a sheet conveying path which can be used as an original sheet conveying path or as a recording sheet conveying path.

Conventionally, as shown in FIG. 4, an original sheet conveying path 1 and a recording sheet conveying path 2 are separately provided in the upper part and the lower part of a facsimile apparatus. Further, an original reading unit 3 is provided on the original sheet conveying path 1 and a recording unit 4 is provided on the recording sheet conveying path 2.

In the conventional apparatus as described above, after a plurality of originals 6 are placed on a document feeder 5, then a separating roller 7 and a separating member 8 pinch the top edge of one of the placed originals to convey it. Thus, the separating roller 7 is provided with torque from driving units in order to separate the originals 6, then the originals 6 are conveyed downstream one at a time. The originals 6 are conveyed to the original reading unit 3 by paper feed rollers 9a and 9b at a constant speed. The original reading unit 3 reads the originals 6, successively the read originals 6 are ejected outside of the main body of the facsimile apparatus by ejecting rollers 10a and 10b. Whereas, a plurality of recording sheets 12 which are stored in a paper cassette 11 are separated by a pick-up roller 13 and conveyed downstream separately. Then each recording sheet 12 is conveyed to the recording unit 4 by paper feed rollers 14a and 14b at a constant speed. The recording unit 4 prints on the recording sheets 12 while the recording sheets are kept conveyed at the constant speed. The printed recording sheets 12 are ejected outside of the main body of the facsimile apparatus by ejecting rollers 15a and 15b.

According to the conventional facsimile apparatus as shown in FIG. 4, relatively large space is required for the facsimile apparatus to have the original sheet conveying path 1 and the recording sheet conveying path 2, since they are provided separately, and prevent minimizing the size of the facsimile apparatus as well as to reduce cost, since a large number of parts are necessary to build the two separate conveying paths.

There can be suggested a facsimile apparatus, as shown in FIG. 5, which has one conveying path which conveys the originals 6 and the recording sheets 12 in the same path throughout.

The problem of the facsimile apparatus shown in FIG. 5 is that a sheet has to be set one at a time, since there is only one feed opening for an original and a record sheet. As a result, a user has to set either the original or the recording sheet, each time, when reception or transmission is operated. Therefore, such the facsimile is inconvenient to use, since receiving operation is commonly expected to be performed automatically.

SUMMARY OF THE INVENTION

The present invention has been made in consideration of the above situation, and has as its object to provide a facsimile apparatus, which is constructed with a minimum number of parts in a size as compact as possible, capable of reading, recording, and receiving data automatically.

Another object, in addition to the aforesaid object, of the present invention is to separate and convey sheets flexibly in response to a somewhat rough handling while loading an original sheet, for example, by setting a feeder selection unit to the side either of the original sheet conveying path or of the recording sheet conveying path during stand-by state.

Further, in a case where the facsimile apparatus received information from a communication line while reading operation of an original is in process, or in a case where an original is set in the document feeder while recording operation on a recording sheet is in process, the feeder selection unit is inhibited to move unless the proceeding reading or recording operation is completed, and the feed roller keeps picking-up either the originals or the recording sheets. Accordingly, another object is to prevent any problem during separation and conveyance of sheets.

According to the present invention, the foregoing object is attained by providing a facsimile apparatus which has an original sheet conveying path for conveying an original and a recording sheet conveying path for conveying a recording sheet, comprising: a common sheet conveying path for conveying either the original or the recording sheet, and which is provided downstream of the original sheet conveying path and the recording sheet conveying path; feeder selection means, which is provided upstream of the common conveying path, for picking-up either the original or the recording sheet by selection; reading means, provided on the common conveying path, for reading the original fed to the common conveying path by the feeder selection means; recording means, provided on the common conveying path, for recording on the recording sheet conveyed fed to the common conveying path by the feeder selection means; and ejecting means for ejecting the original and the recording sheet to the outside.

Further, the foregoing object is also attained by providing a facsimile apparatus which has an original sheet conveying path for conveying an original and a recording sheet conveying path for conveying a recording sheet, comprising: an original holder, provided at an original feeding opening formed on the upper side of the facsimile apparatus, for storing one or a plurality of originals; a detachable recording sheet holder, provided at a recording sheet feeding opening formed on the lower side of the facsimile apparatus, for storing one or a plurality of recording sheets; a common sheet conveying path for conveying either the original or the recording sheet, and which is provided downstream of the original sheet conveying path and the recording sheet conveying path; feeder selection means, which is provided upstream of the common conveying path, for picking-up either the original or the recording sheet by selection; reading means, provided on the common conveying path, for reading the original fed to the common conveying path by the feeder selection means; recording means, provided on the common conveying path, for recording on the recording sheet conveyed fed to the common conveying path by the feeder selection means; and ejecting means, provided on the opposite side of which holders are provided, for ejecting the original and the recording sheet to the outside.

Furthermore, the foregoing object is also attained by providing a facsimile apparatus which has an original sheet conveying path for conveying an original and a recording sheet conveying path for conveying a recording sheet, comprising: a common sheet conveying path for conveying either the original or the recording sheet, and which is provided downstream of the original sheet conveying path and the recording sheet conveying path; feeder selection means which is provided upstream of the common conveying path, and which includes a controller to position the feed selection means on the side of the original sheet conveying path during stand-by state for transmitting and receiving, for picking-up either the original or the recording sheet by selection; reading means, provided on the common conveying path, for reading the original fed to the common conveying path by the feeder selection means; recording means, provided on the common conveying path, for recording on the recording sheet conveyed fed to the common conveying path by the feeder selection means; and ejecting means for ejecting the original and the recording sheet to the outside.

Further, the foregoing object is also attained by providing a facsimile apparatus which has an original sheet conveying path for conveying an original and a recording sheet conveying path for conveying a recording sheet, comprising: an original holder, provided at an original feeding opening formed on the upper side of the facsimile apparatus, for storing one or a plurality of originals; a detachable recording sheet holder, provided at a recording sheet feeding opening formed on the lower side of the facsimile apparatus, for storing one or a plurality of recording sheets; a common sheet conveying path for conveying either the original or the recording sheet, and which is provided downstream of the original sheet conveying path and the recording sheet conveying path; feeder selection means which is provided upstream of the common conveying path, and which includes a controller to position the feed selection means on the side of the original sheet conveying path during stand-by state for transmitting and receiving, for picking-up either the original or the recording sheet by selection; reading means, provided on the common conveying path, for reading the original fed to the common conveying path by the feeder selection means; recording means, provided on the common conveying path, for recording on the recording sheet conveyed fed to the common conveying path by the feeder selection means; and ejecting means, provided on the opposite side of which holders are provided, for ejecting the original and the recording sheet to the outside.

Further, the foregoing object is also attained by providing a facsimile apparatus comprising: a common sheet conveying path for conveying either an original or a recording sheet; an original feeding opening for feeding the original into the original sheet conveying path; a recording sheet feeding opening for feeding the recording sheet into the recording sheet conveying path; a rocking roller for conveying either the original from the original feeding opening or the recording sheet from the recording sheet feeding opening by selection; reading means, provided on the common conveying path, for reading the original fed to the common conveying path by the feeder selection means; and recording means, provided on the common conveying path, for recording on the recording sheet conveyed fed to the common conveying path by the feeder selection means.

Further, the foregoing object is also attained by providing a facsimile apparatus comprising: a common sheet conveying path for conveying either an original or a recording sheet; an original feeding opening for feeding the original into the original sheet conveying path; a recording sheet feeding opening for feeding the recording sheet into the recording sheet conveying path; a rocking roller for conveying either the original from the original feeding opening or the recording sheet from the recording sheet feeding opening by selection; reading means, provided on the common conveying path, for reading the original fed to the common conveying path by the feeder selection means; recording means, provided on the common conveying path, for recording on the recording sheet conveyed fed to the common conveying path by the feeder selection means; and control means for keeping the rocking roller on the side either of the original feeding opening or of the recording sheet feeding opening during stand-by state for transmission or reception.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

Preferred embodiments of the present invention will be described in detail in accordance with the accompanying drawings.

Figure 1:
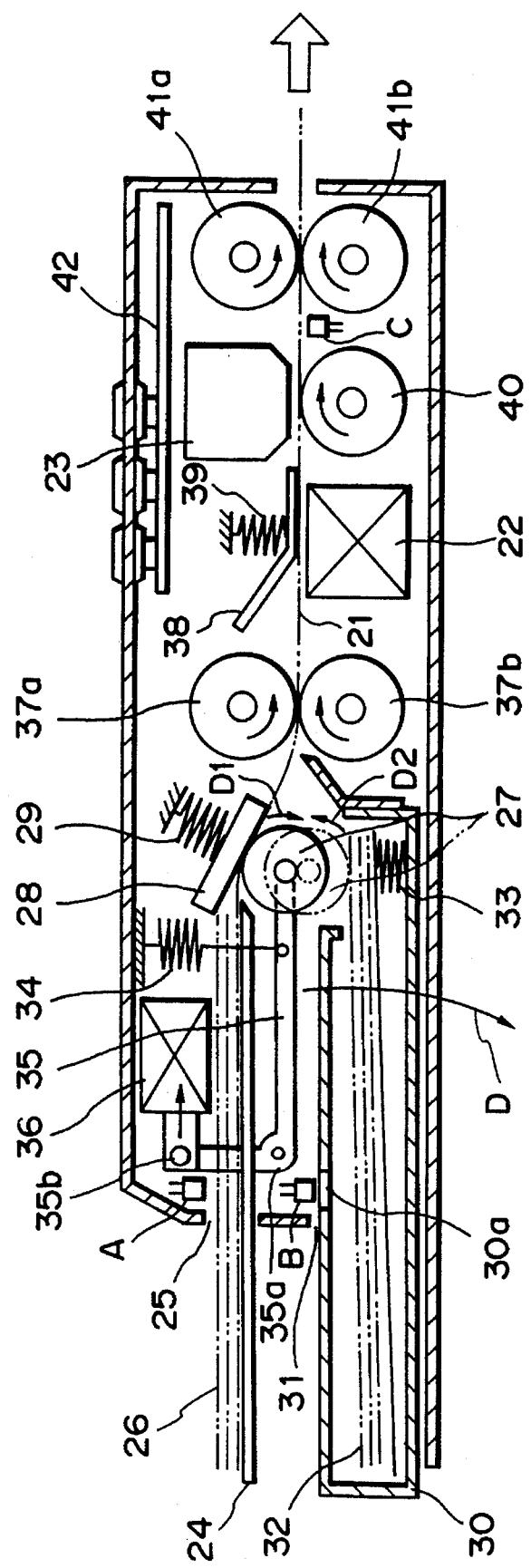
FIG. 1 is a cross sectional view of a facsimile apparatus according to an embodiment of the present invention.

FIG. 1 is a cross sectional view of a facsimile apparatus seen along a sheet conveying path. In FIG. 1, the sheet conveying path 21 is for conveying either an original or a recording sheet, and an original reading unit 22 and a recording unit 23 are provided on the sheet conveying path 21.

A document feeder 24 capable of holding a plurality of originals 26 is provided upstream on the sheet conveying path 21, and the originals 26 are fed one at a time via an original feeding opening 25. A sensor A is for detecting the existence of the originals 26. When the plurality of originals are placed on the document feeder 24, the top edges of the originals 26 are pinched between a feed roller 27 for picking up and separating documents and a separating member 28 biased downward by a separating member pressing spring 29, then the feed roller 27 rotates in the D1 direction in FIG. 1, thereby the originals 26 are separated and conveyed downstream one at a time.

The recording sheet cassette 30 is set at a recording sheet feeding opening 31, and it is possible to store a plurality of recording sheets 32 in the recording sheet cassette 31. The recording sheets 32 are lifted up by a spring 33 as shown in FIG. 1.

A sensor B for detecting through a hole 30a whether or not any recording sheet 32 is set is provided on the back of the recording sheet feeding opening 31. The operation of detection will be described later. Further, after the feed roller 27 is moved in the D direction in FIG. 1 so that it touches to the surface of the top recording sheet of the plurality of recording sheets 32 stored in the recording sheet cassette 30, the feed roller 27 rotates in the D2 direction so that the recording sheets 32 are separated and conveyed downstream one at a time.

A mechanism which enables the feed roller 27 to rotate for picking-up and separating sheets can be selected from a plurality of mechanisms. Among them a feed roller having simplest construction is described below.

In FIG. 1, the feed roller 27 is provided so as to be able to rotate at the end of the L-shaped pick-up arm 35 which rotates around a fulcrum 35a, and the feed roller 27 is driven by a driving motor (not shown). A pull spring whose one end is fixed to the main body 34 is attached to the pick-up arm 35 at the side where the feed roller is provided so that the feed roller 27 touches to the separating member 28. At the other end, 35b, of the pick-up arm 35, a plunger of a solenoid 36 is connected. When electricity is supplied to the solenoid 36, the pick-up arm 35 is rotated in the clockwise direction opposing to the pulling force of the pull spring 34, then the feed roller 27 is rotated to the side of the recording sheets 32.

A paper feed rollers 37a and 37b are placed near the confluence of the sheet conveying path 21 for conveying the originals 26 or the recording sheets 32 as shown in FIG. 1. These paper feed rollers 37a and 37b are driven by a driving motor (not shown), and originals 26 are conveyed to a original reading unit 22 to be read. For example, the conveyed originals are read line by line by a contact type line image sensor. In order to read the originals 26, there is provided a pressing member 38 for pressing one of the originals 26 against the original reading unit 22, where the pressing member is pressed by a spring 39, so that the original is read while it contacts to the original reading unit 22.

Whereas the recording sheets 32, which are conveyed by the paper feed rollers 37a and 37b, are conveyed to a recording unit 23, and printed. A pressing roller 40 for pressing the recording sheets 32 against a recording unit 23 is provided so as to be able to rotate, and a predetermined recording operation (e.g., a thermal printing operation on a thermal paper by using a line thermal head or a printing operation on a standard recording paper sheet by using a serial recording type ink-jet head) is performed. Further, ejecting rollers 41a and 41b for ejecting the originals 26 or recording sheets 32 outside of the main body of the facsimile apparatus in the direction of large arrow in FIG. 1, are provided downstream on the sheet conveying path 21. Further, a control board 42 having a controller is placed over the recording unit 23, and operates as described below. Further, a sensor C for detecting either the sheet is an original or a recording paper is provided near the pressing roller 40.

Reading Operation

Next, according to the configuration of the facsimile apparatus as described above, an operation for reading the originals 26 will be explained. In this case, the controller of the control board 42 does not issue a signal to drive the solenoid 36, thus the feed roller 27 is pulled by the pull spring 34 to the position shown by a solid line in the FIG. 1, and touches to the separating member 28. The originals 26 are set on the document feeder 24 through the original feeding opening 25, and the top edges of the originals 26 are pinched between the feed roller 27 and the separating member 28. Successively, the feed roller 27 separates the originals 26 from the bottom of the pile of the originals 26 and conveys one at a time by rotating in accordance with an instruction to driving units (not shown) from the controller of the control board 42.

The first sheet of the separated originals 26 is conveyed to the original reading unit 22 by the paper feed rollers 37a and 37b rotating in the direction of arrows in FIG. 1 at a fixed rotational speed. At the original reading unit 22, the first sheet of the originals 26 is pressed against the original reading unit 22 by the pressing member 38 for reading the first sheet. The read first sheet of the originals 26 is ejected outside of the facsimile apparatus by the ejecting rollers 41a and 41b.

Each sheet of the originals 26 is conveyed to the original reading unit 22, and ejected after being read, in the same manner as the first sheet of the originals 26 is processed.

Recording Operation

Recording operation on the recording sheets 32 will be explained.

In this case, electricity is supplied to the solenoid 36 based on an instruction by the controller of the control board 42. As a result, the plunger is attracted by the solenoid in the direction of an arrow, and the pick-up arm 35 rotates in the direction of the arrow D against the pulling force of the pull spring 34. Thus, the feed roller 27 moves to a position shown by a broken line in FIG. 1.

A plurality of recording sheets 32 are stored in the recording sheet cassette 30, and pushed up at the front by the spring 33 which is provided inside of the recording sheet cassette 30. The recording sheet cassette 30 is set at the recording sheet feeding opening 31. After the recording sheet cassette 30 is set in the main body, the feed roller 27 is in the position where it touches to the top recording sheet of the plurality of the recording sheets 32 at the front part. The feed roller 27 rotates in the direction of an arrow D2 in accordance with an instruction from the controller of the control board 42, and conveys one of the recording sheets 32 to the paper feed rollers 37a and 37b. The conveyed recording sheet 32 is further conveyed to the recording unit 23 downstream. At the recording unit 23, the first conveyed sheet of the recording sheets 32 is pressed against the recording unit 23 by the pressing roller 40, and printed. The printed recording sheet 32 is ejected outside of the main body by the ejecting roller 41a and 41b.

Each sheet of the recording sheets 32 is conveyed to the recording unit 23, and ejected after being printed, in the same manner as the first sheet of the recording sheet 26 is processed.

Figure 2:
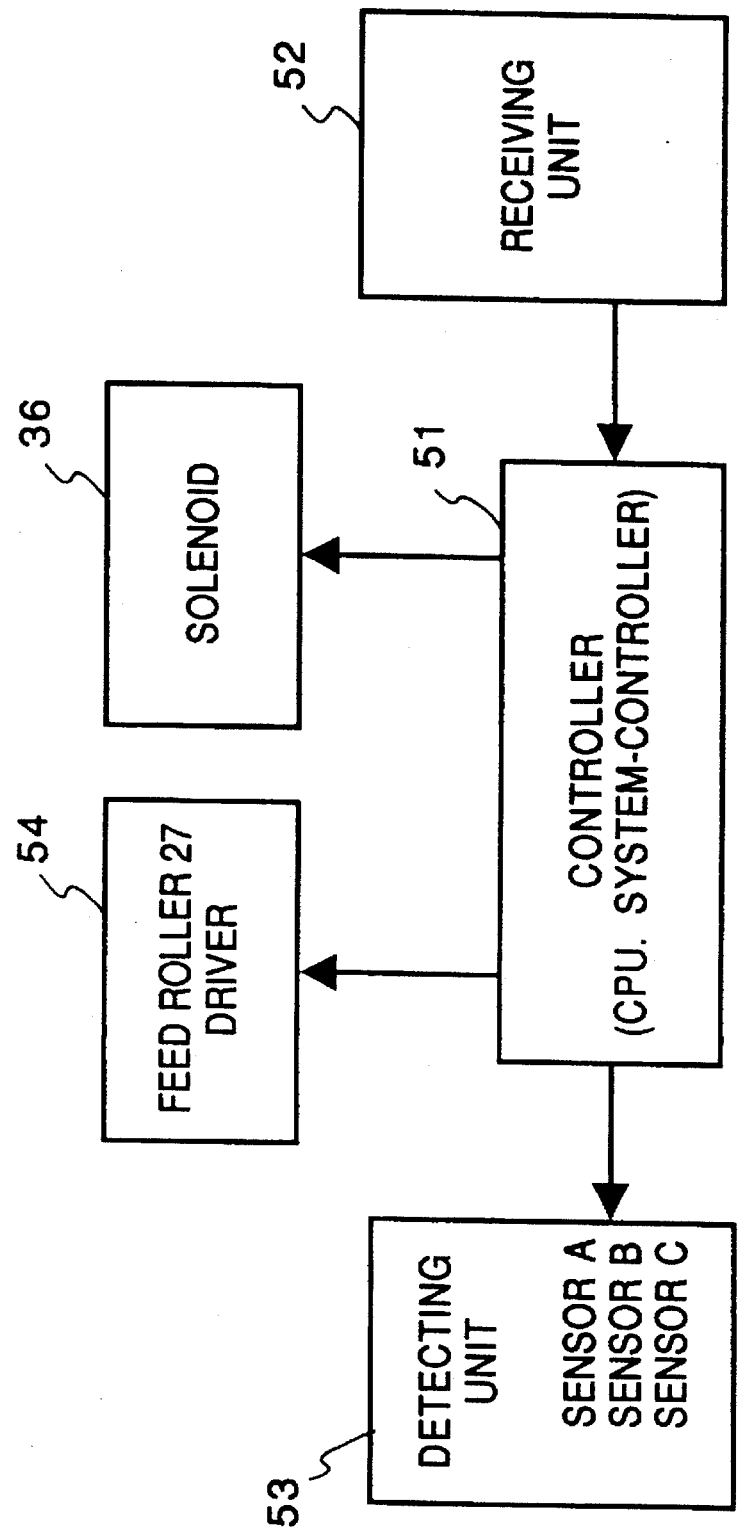
FIG. 2 is a block diagram of the facsimile apparatus in FIG. 1.

FIG. 2 is a block diagram of a major part of the facsimile apparatus of the present invention, which showing connection relationship among the controller of the control board 42, the feed roller 27, the solenoid 36, and the sensors A, B, and C shown in FIG. 1.

In FIG. 2, the controller 51 which comprises CPU and the like is connected to a receiving unit 52 to be connected to a communication line, and to a detecting unit 53 including the sensors A, B, and C, further connected to a driving unit 54 to drive the feed roller 27 and the like, and the solenoid 36.

Figure 3:
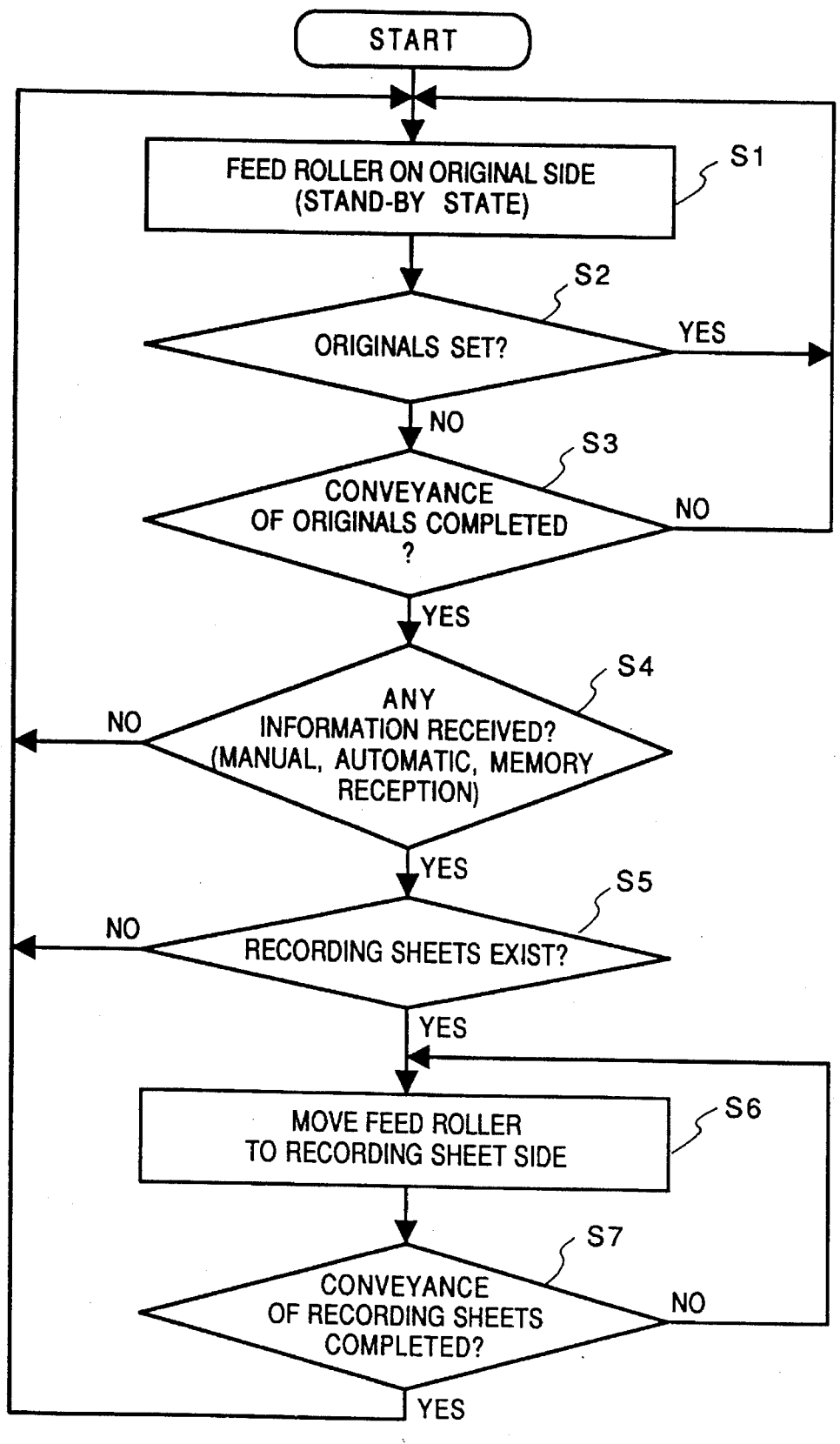
FIG. 3 is a flowchart showing an example of operation of the block diagram shown in FIG. 2.
Figure 4:
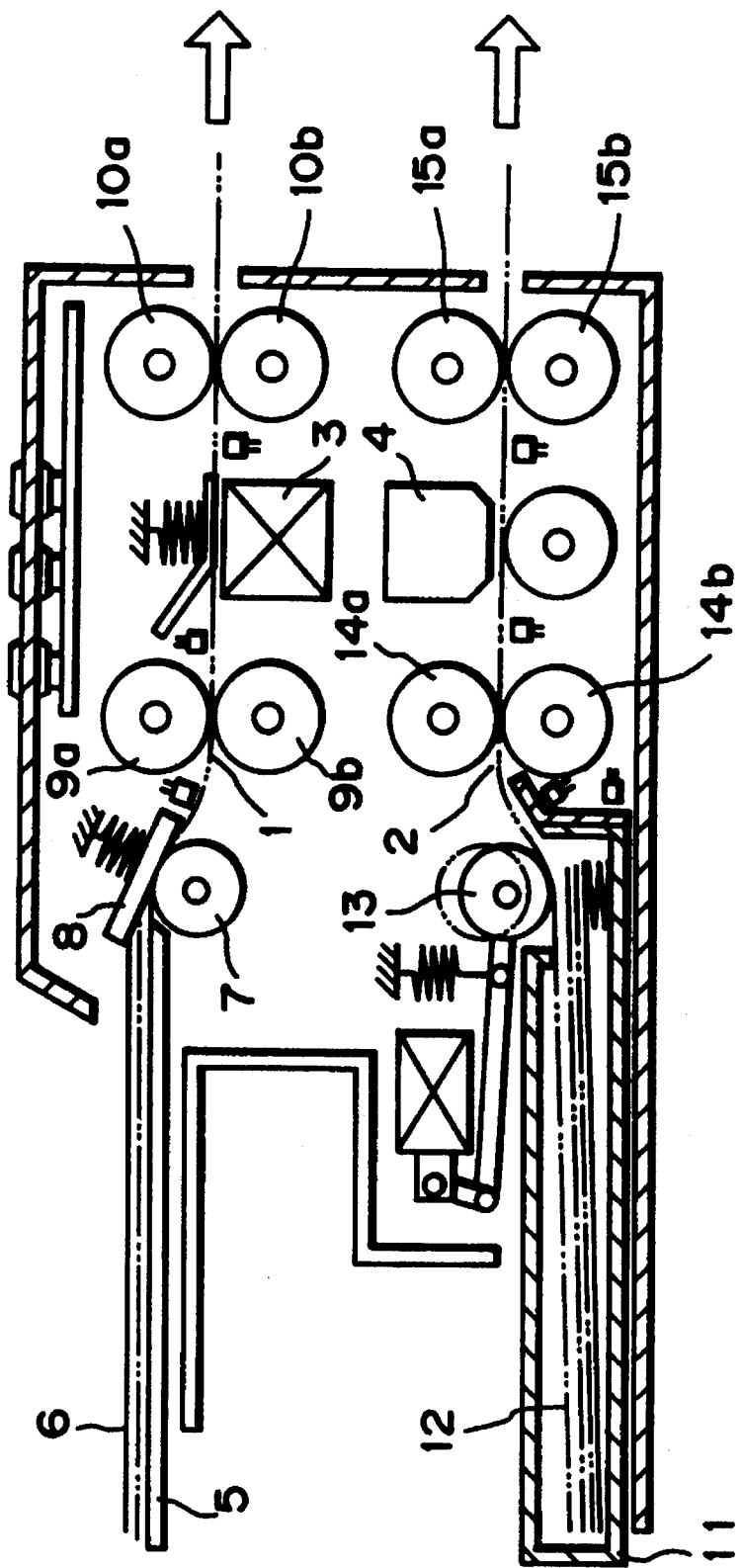
FIG. 4 is a cross sectional view of a conventional facsimile apparatus.
Figure 5:
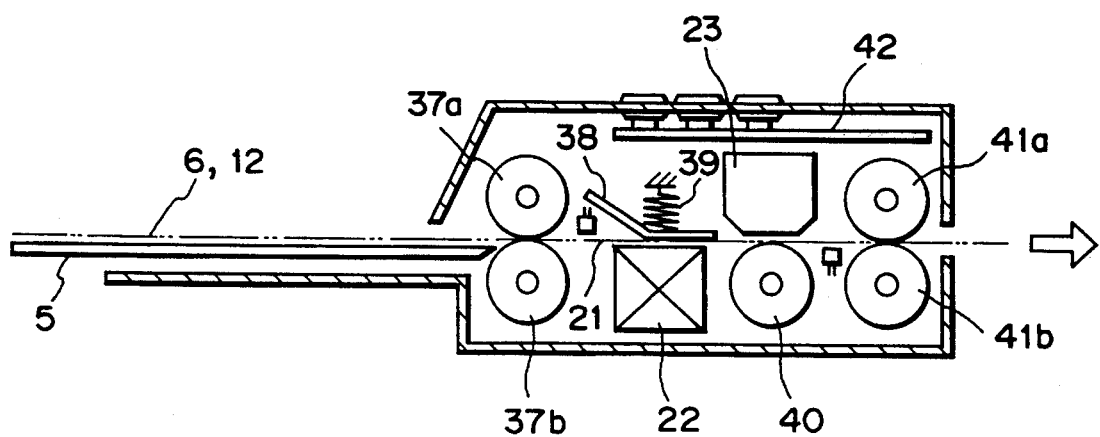
FIG. 5 is a cross sectional view of a conventional facsimile apparatus.

FIG. 3 is a flowchart showing an example of operation of the block diagram shown in FIG. 2. In Fig. 3, the controller 51 does not instruct to supply electricity to the solenoid 36 during stand-by status before transmission or reception, thus the feed roller 27 is placed in the position for original conveyance at step S1.

When one or a plural of originals 26 are set on the document feeder 24 through the original feeding opening 25, the process proceeds to step S2, and the sensor A detects the existence of the original/originals. Then the controller 51 instructs the driving unit 54 to drive the feed roller 27. Accordingly, the originals 26 is separated and conveyed downstream one sheet at a time.

If absence of any original 26 is detected by sensor A at step S2, whether or not any original 26 is still on the sheet conveying path is determined at step S3. When the existence of any original 26 is detected by a sensor C at step S3, then it is determined that the original or originals 26 are under reading operation, then the process moves back to step S1.

Whereas, when absence of an original 26 is determined by the sensor C at step S3, it is determined that the all the originals 26 have been conveyed, then the process moves to step S4. At step S4, if there is detected that any information is received, the process proceeds to step S5 and existence of the recording sheets 32 is checked.

When the recording sheet cassette 30 storing a plurality of recording sheets 32 is set at the recording sheet feeding opening 31, the sensor B detects the existence of the recording sheets 32, and the process moves to step S6. The controller 51 issues an instruction to supply electricity to the solenoid 36, and the feed roller 27 is moved to the side of the recording sheets 32 against the pulling force of the pull spring 34 because of the effect of the solenoid 36. Then, the controller 51 instructs the driving unit 54 to rotate the feed roller 27 in the direction of the arrow D2, and as a result, the recording sheets are separated and conveyed one sheet at a time.

When printing of received information has finished, the process proceeds to step S7, and after confirming the completion of conveyance of the recording sheets 32 by the sensor C, the process moves back to step S1.

At step S1, electricity supplied to the solenoid 36 is stopped, thereby the feed roller 27 is moved back to the side of the original sheet conveying path because of the pulling force by the pull string 34, then the device is in a stand-by state.

In a case where there is no received information from the receiving unit 52 at step S4, or in a case where absence of recording sheet 32 is detected at step S5, the process also moves back to step S1. It should be noted that a reason why the feed roller 27 is placed on the side of originals 26 during stand-by state is that the feed roller 27 can be ready for a reading operation immediately when a user sets the originals, so that the originals can be separated and conveyed without any error. On the contrary, for receiving information, there is enough time, between the start of receiving information through a communication line and the start of printing because of the communicating operation, for instance, to move the feed roller 27 to the side of the recording sheet conveying path. Therefore, there is no inconvenience if the feed roller is placed on the side of the original sheet conveying path during stand-by status. Further, if the originals 26 are set while printing in the receiving state, as shown in the above described flowchart, the controller 51 instructs to continue conveying the recording sheets 32 until the completion of conveyance of the recording sheets 32 is confirmed, and if any information is received while the originals 26 are read, the controller 51 instructs to prohibit to start printing unless the completion of conveyance of the originals is confirmed. Therefore, there is no difficulty regarding these two cases.

In short, during reading originals or during printing received information, the feed roller 27 is controlled to stay in the current position, not to move.

It should be noted that according to the aforesaid embodiment, the facsimile apparatus performs only transmission and reception, however, the present invention is also applicable to an apparatus having a scanner and a printer. Further, the feed roller is placed in the original side during stand-by state, however, if there is enough time to move the feed roller between when originals are set and the start of reading, there is no problem in setting the feed roller to the recording sheet side during stand-by state.

According to the present invention as described above, advantages are that a facsimile apparatus can be built in a compact size, which does not require a large space, and can be built at a lower cost by reducing the number of parts required to build the facsimile apparatus.

Further, by placing a feed roller always on one side, especially on the original side, during stand-by state, conveying and reading operation can be immediately started when originals are set. Further, since the feed roller is not moved unless the conveyance of the originals or the recording sheets is confirmed, if information is received during original reading process or if originals are set during printing process, the separation operation of the originals or the pick-up operation of the recording sheets is not terminated, which reduces the occurrence of errors.

The present invention is not limited to the construction described in the above embodiment. For example, the positions of the reading unit 22 and the recording unit 23 can be exchanged on the sheet conveying path 21. Further, the document feeder 24, capable of holding a plurality of originals 26, at the original feeding opening 25 can be provided below the recording sheet cassette 30 on a side of the facsimile apparatus. Furthermore, the mechanism to rotate the feed roller 27, which picks-up the recording sheets and separates originals, is not limited to the aforesaid construction, and can be altered.

The present invention can be applied to a system constituted by a plurality of devices, or to an apparatus comprising a single device. Furthermore, the invention is applicable also to a case where the object of the invention is attained by supplying a program to a system or apparatus.

The present invention is not limited to the above embodiments and various changes and modifications can be made within the spirit and scope of the present invention. Therefore to appraise the public of the scope of the present invention, the following claims are made.

What is claimed is:

1. A facsimile apparatus which has an original sheet conveying path for conveying an original and a recording sheet conveying path for conveying a recording sheet, comprising:

a common sheet conveying path for conveying either the original or the recording sheet, and which is provided downstream of the original sheet conveying path and the recording sheet conveying path;

feeder selection means, which is provided upstream of said common sheet conveying path, for picking-up either the original or the recording sheet by selection;

reading means, provided on said common sheet conveying path, for reading the original fed to said common sheet conveying path by said feeder selection means;

recording means, provided on said common sheet conveying path, for recording on the recording sheet fed to said common sheet conveying path by said feed selection means; and ejecting means for ejecting the original and the recording sheet to the outside, wherein said feeder selection means is always at a position where said means can select the original sheet, and has control means for changing the position upon conveying the recording sheet, and wherein said control means does not change the position of said feeder selection means until conveyance of the original or recording sheet has been completed.

2. The facsimile apparatus according to claim 1, further comprising:
   an original feeding opening, provided on a side of the facsimile apparatus, for feeding the original into the original sheet conveying path; and
   a recording sheet feeding opening, provided on a side of the facsimile apparatus, for feeding the recording sheet into the recording sheet conveying path.

3. The facsimile apparatus according to claim 2, further comprising:
   an original holder, provided at said original feeding opening, for storing one or a plurality of originals; and
   a recording sheet holder, provided at said recording sheet feeding opening, for storing one or a plurality of recording sheets.

4. The facsimile apparatus according to claim 2, further comprising:
   an original holder, provided at said original feeding opening, for storing one or a plurality of originals; and
   a detachable recording sheet holder, provided at said recording sheet feeding opening, for storing one or a plurality of recording sheets.

5. The facsimile apparatus according to either claim 3 or claim 4, wherein said original holder and either said recording sheet holder or said detachable recording sheet holder are separately provided on a side of the facsimile apparatus one above the other.

6. The facsimile apparatus which has an original sheet conveying path for conveying an original and a recording sheet conveying path for conveying a recording sheet, comprising:
   a common sheet conveying path for conveying either the original or the recording sheet, and which is provided downstream of the original sheet conveying path and the recording sheet conveying path;
   feeder selection means, which is provided upstream of said common sheet conveying path, for picking-up either the original or the recording sheet by selection;
   reading means, provided on said common sheet conveying path, for reading the original fed to said common sheet conveying path by said feeder selection means;
   recording means, provided on said common sheet conveying path, for recording on the recording sheet fed to said common sheet conveying path by said feeder selection means; and
   ejecting means for ejecting the original and the recording sheet to the outside, wherein said feeder selection means comprises:
     a rotation member which is supported so as to be able to rotate;
     a feed roller which is supported by said rotation member so as to be able to rotate, and which can be driven in both clockwise and counter clockwise directions;
     biasing means for biasing said rotation member to a side either of said original sheet conveying path or of said recording sheet conveying path; and
     a driving unit for driving said rotation member so as to rotate to the opposite side of said original sheet conveying path or of said recording sheet conveying path against biasing force by said biasing means.

7. The facsimile apparatus according to claim 6, wherein said feed roller is moved by said driving unit either to the position where said feed roller touches an original separation means for separating originals set on an original holder capable of storing a plurality of originals, or to the position where said feed roller touches a recording sheet separation means for separating recording sheets stored in a recording sheet holder capable of storing a plurality of recording sheets.

8. A facsimile apparatus which has an original sheet conveying path for conveying an original and a recording sheet conveying path for conveying a recording sheet, comprising:
   a common sheet conveying path for conveying either the original or the recording sheet, and which is provided downstream of the original sheet conveying path and the recording sheet conveying path;
   feeder selection means which is provided upstream of said common conveying path, and which includes a controller to position said feed selection means on the side of said original sheet conveying path during standby state for transmitting and receiving, for picking-up either the original or the recording sheet by selection;
   reading means, provided on said common sheet conveying path, for reading the original fed to said common sheet conveying path by said feeder selection means;
   recording means, provided on said common sheet conveying path, for recording on the recording sheet fed to said common sheet conveying path by said feeder selection means; and
   ejection means for ejecting the original and the recording sheet to the outside, wherein the controller instructs so as not to move the feeder selection means until conveyance of an original or a recording sheet is completed.

9. The facsimile apparatus which has an original sheet conveying path for conveying an original and a recording sheet conveying path for conveying a recording sheet, comprising:
   a common sheet conveying path for conveying either the original or the recording sheet, and which is provided downstream of the original sheet conveying path and the recording sheet conveying path;
   feeder selection means, which is provided upstream of said common sheet conveying path, or picking-up either the original or the recording sheet by selection;
   reading means, provided on said common sheet conveying path, for reading the original fed to said common sheet conveying path by said feeder selection means;
   recording means, provided on said common sheet conveying path, for recording on the recording sheet fed to said common sheet conveying path by said feed selection means; and
   ejecting means for ejecting the original and the recording sheet to the outside, wherein said feeder selection means comprises:
     a rotation member which is supported so as to be able to rotate;
     a feed roller which is supported by said rotation member so as to be able to rotate, and which can be driven in both clockwise and counter clockwise directions;
     biasing means for biasing said rotation member to a side either of said original sheet conveying path or of said recording sheet conveying path; and
     a driving unit for driving said rotation member so as to rotate to the opposite side of said original sheet conveying path or of said recording sheet conveying path against biasing force by said biasing means in accordance with an instruction by said controller.

10. A facsimile apparatus comprising:

a common sheet conveying path for conveying either an original or a recording sheet;

an original feeding opening for feeding the original into the common sheet conveying path;

a recording sheet feeding opening for feeding the recording sheet into the common sheet conveying path;

a rocking roller for conveying either the original from said original feeding opening or the recording sheet from said recording sheet feeding opening by selection;

reading means, provided on said common sheet conveying path, for reading the original feed to said common sheet conveying path by said rocking roller; and recording means, provided on said common sheet conveying path, for recording on the recording sheet conveyed fed to said common sheet conveying path by said rocking roller.

11. A facsimile apparatus comprising:

a common sheet conveying path for conveying either an original or a recording sheet;

an original feeding opening for leading the original into the common sheet conveying path;

a recording sheet feeding opening for feeding the recording sheet into the common sheet conveying path;

a rocking roller for conveying either the original from said original feeding opening or the recording sheet from said recording sheet feeding opening by selection;

reading means, provided on said common sheet conveying path, for reading the original fed to said common sheet conveying path by said rocking roller;

recording means, provided on said common sheet conveying path, for recording on the recording sheet conveyed fed to said common sheet conveying path by said rocking roller; and control means for keeping, said rocking roller on the side either of said original feeding opening or of said recording sheet feeding opening during stand-by state for transmission or reception.

* * * * *

UNITED STATES PATENT AND TRADEMARK OFFICE
CERTIFICATE OF CORRECTION

PATENT NO. : 5,587,812
DATED : December 24, 1996
INVENTOR(S) : Michio KASUYA

It is certified that error appears in the above-indentified patent and that said Letters Patent is hereby corrected as shown below:

COLUMN 1

Line 53, "record" should read --recording--;

Line 56, delete "the".

COLUMN 2

Line 6, "received" should read --receives--;

Line 11, "proceeding" should read --preceding--.

COLUMN 3

Line 33, delete "con-"--;

Line 34, delete "veyed".

COLUMN 4

Line 24, "OF" should read --OF--;

Line 67, "simplest" should read --the simplest--.

UNITED STATES PATENT AND TRADEMARK OFFICE
CERTIFICATE OF CORRECTION

PATENT NO. : 5,587,812
DATED : December 24, 1996
INVENTOR(S) : Michio KASUYA

It is certified that error appears in the above-indentified patent and that said Letters Patent is hereby corrected as shown below:

COLUMN 5

Line 13, "A paper" should read --Paper--.

Line 26, "Whereas the" should read --The-- and "32, which" should read --32--;

Line 27, delete "are conveyed";

Line 41, "either" should read --whether--.

COLUMN 6

Line 43, "showing" should read --shows the--;

Line 64, "is" should read --are--.

COLUMN 7

Line 4, "then" should read --and----;

Line 5, "Whereas, when" should read --When--;

Line 30, "string" should read --spring--;

Line 66, "state, however," should read --state. However,--.

UNITED STATES PATENT AND TRADEMARK OFFICE
CERTIFICATE OF CORRECTION

Page 3 of 4

PATENT NO. : 5,587,812
DATED : December 24, 1996
INVENTOR(S) : Michio KASUYA

It is certified that error appears in the above-indentified patent and that said Letters Patent is hereby corrected as shown below:

COLUMN 8

Line 37, "appraise" should read --apprise--.

COLUMN 9

Line 57, "counter clockwise" should read --counterclockwise--.

COLUMN 10

Line 59, "counter clockwise" should read --counterclockwise--.

COLUMN 11

Line 16, delete "con-";

Line 17, delete "veyed".

UNITED STATES PATENT AND TRADEMARK OFFICE
CERTIFICATE OF CORRECTION

PATENT NO. : 5,587,812
DATED : December 24, 1996
INVENTOR(S) : Michio KASUYA

It is certified that error appears in the above-indentified patent and that said Letters Patent is hereby corrected as shown below:

COLUMN 12

Line 13, delete "con-";

Line 14, delete "veyed";

Line 16, "keeping," should read --keeping--.

Signed and Sealed this

Twenty-second Day of July, 1997

Attest:

BRUCE LEHMAN

Attesting Officer

Commissioner of Patents and Trademarks